United States Patent
Lee et al.

(10) Patent No.: US 12,531,300 B2
(45) Date of Patent: Jan. 20, 2026

(54) METHOD FOR MANUFACTURING SECONDARY BATTERY AND SECONDARY BATTERY MANUFACTURED USING THE MANUFACTURING METHOD

(71) Applicant: LG ENERGY SOLUTION, LTD., Seoul (KR)

(72) Inventors: Jin Soo Lee, Daejeon (KR); Bu Won Son, Daejeon (KR); Jin Yeong Lee, Daejeon (KR); Yong Gon Lee, Daejeon (KR); Jeong Ho Park, Daejeon (KR); Yeong Hun Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 440 days.

(21) Appl. No.: 18/013,760

(22) PCT Filed: Sep. 14, 2021

(86) PCT No.: PCT/KR2021/012493
§ 371 (c)(1),
(2) Date: Dec. 29, 2022

(87) PCT Pub. No.: WO2022/060051
PCT Pub. Date: Mar. 24, 2022

(65) Prior Publication Data
US 2023/0327244 A1    Oct. 12, 2023

(30) Foreign Application Priority Data
Sep. 16, 2020    (KR) .................... 10-2020-0119504

(51) Int. Cl.
*H01M 50/169*    (2021.01)
*B23K 26/21*    (2014.01)
(Continued)

(52) U.S. Cl.
CPC .......... *H01M 50/169* (2021.01); *B23K 26/21* (2015.10); *B23K 37/0443* (2013.01); *H01M 50/105* (2021.01)

(58) Field of Classification Search
None
See application file for complete search history.

(56) References Cited

U.S. PATENT DOCUMENTS 5,279,623 A    1/1994    Watanabe et al.
9,954,204 B2 *  4/2018    Yun ..................... H01M 50/105
(Continued)

FOREIGN PATENT DOCUMENTS

CN    1874030 A    12/2006
CN    105470413 A    4/2016
(Continued)

OTHER PUBLICATIONS

International Search Report (with partial translation) and Written Opinion dated Jan. 3, 2022, for corresponding International Patent Application No. PCT/KR2021/012493.
(Continued)

*Primary Examiner* — Carlos Barcena
(74) *Attorney, Agent, or Firm* — Morgan, Lewis & Bockius LLP (57) ABSTRACT

A method for manufacturing a secondary battery includes preparing a lower can having an accommodation part to accommodate an electrode assembly, and an upper cover covering an upper opening of the lower can; gripping an end of a lower can circumferential portion and an end of an upper cover circumferential portion at upper and lower portions using upper and lower jigs to weld the lower can circumferential portion extending outward from an edge of the accommodation part to the upper cover circumferential portion that is a circumferential area of the upper cover; and
(Continued)

irradiating a laser onto a bonding portion at which the lower can circumferential portion and the upper cover circumferential portion are welded to each other. In the irradiating, a height of the accommodation part is higher than a height of the end of the lower can circumferential portion.

11 Claims, 4 Drawing Sheets

(51) Int. Cl.
*B23K 37/04* (2006.01)
*H01M 50/105* (2021.01)

(56) References Cited

U.S. PATENT DOCUMENTS

| | | |
|---|---|---|
| 2006/0275658 A1 | 12/2006 | Sanada et al. |
| 2007/0059594 A1 | 3/2007 | Jeon et al. |
| 2011/0086259 A1* | 4/2011 | Kim .................. H01M 10/0436 |
| | | 429/162 |
| 2011/0091766 A1 | 4/2011 | Kim |
| 2013/0202951 A1 | 8/2013 | Kawai et al. |
| 2015/0000117 A1* | 1/2015 | Cho .................. H01M 10/0404 |
| | | 29/730 |
| 2015/0030913 A1 | 1/2015 | Aamodt et al. |
| 2016/0254501 A1 | 9/2016 | Saimaru et al. |
| 2017/0237045 A1 | 8/2017 | Kim et al. |
| 2019/0184502 A1 | 6/2019 | Kim et al. |
| 2020/0295319 A1 | 9/2020 | Ko et al. |
| 2021/0184308 A1 | 6/2021 | Kim et al. |

FOREIGN PATENT DOCUMENTS

| | | |
|---|---|---|
| CN | 105723542 A | 6/2016 |
| CN | 111542944 A | 8/2020 |
| CN | 111566840 A | 8/2020 |
| EP | 4166268 A1 | 4/2023 |
| JP | S54-143818 A | 11/1979 |
| JP | H03-283353 A | 12/1991 |
| JP | H04-033787 A | 2/1992 |
| JP | H04-149958 A | 5/1992 |
| JP | H11-047956 A | 2/1999 |
| JP | 3177298 B2 | 6/2001 |
| JP | 2003-132857 A | 5/2003 |
| JP | 2004-179050 A | 6/2004 |
| JP | 2005-026040 A | 1/2005 |
| JP | 2007-210165 A | 8/2007 |
| JP | 2012-028490 A | 2/2012 |
| JP | 2013-025978 A | 2/2013 |
| JP | 2013-091085 A | 5/2013 |
| JP | 2014-65050 A | 4/2014 |
| JP | 5484242 B2 | 5/2014 |
| JP | 6113972 B2 | 4/2017 |
| JP | 2023-534484 A | 8/2023 |
| KR | 10-2005-0028722 A | 3/2005 |
| KR | 10-0749477 B1 | 8/2007 |
| KR | 10-2010-0092684 A | 8/2010 |
| KR | 10-2011-0041071 A | 4/2011 |
| KR | 10-2012-0096310 A | 8/2012 |
| KR | 10-2019-0072337 A | 6/2019 |

OTHER PUBLICATIONS

Office Action issued Feb. 13, 2024 for Japanese Patent Application No. 2022-581544 (Note: JP 2012-028490 A was cited in a prior IDS.).

Office Action issued on Oct. 1, 2025 in Chinese Patent Application No. 202180048078.9.

* cited by examiner

METHOD FOR MANUFACTURING SECONDARY BATTERY AND SECONDARY BATTERY MANUFACTURED USING THE MANUFACTURING METHOD

CROSS-REFERENCE TO RELATED APPLICATION

The present application claims the benefit of the priority of Korean Patent Application No. 10-2020-0119504, filed on Sep. 16, 2020, which is hereby incorporated by reference in its entirety.

TECHNICAL FIELD

The present invention relates to a method for manufacturing a secondary battery and a secondary battery manufactured by using the manufacturing method, and more particularly, to a method for manufacturing a secondary battery, in which, when a thin film can is welded, a bonding portion is improved in adhesion to prevent an non-welded portion from occurring, thereby remarkably improving sealing properties, and a secondary battery manufactured by using the manufacturing method.

BACKGROUND ART

In recent years, the price of energy sources increases due to the depletion of fossil fuels, the interest in environmental pollution is amplified, and the demand for eco-friendly alternative energy sources is becoming an indispensable factor for future life. Accordingly, studies on various power generation technologies such as solar power, wind power, and tidal power are continuing, and power storage devices such as batteries for more efficiently using the generated electrical energy are also of great interest.

Furthermore, as technology development and demand for electronic mobile devices and electric vehicles using batteries increase, the demands for batteries as energy sources are rapidly increasing. Thus, many studies on batteries which are capable of meeting various demands have been conducted.

In particular, in terms of materials, there is a high demand for lithium secondary batteries such as lithium ion batteries and lithium ion polymer batteries having advantages such as high energy density, discharge voltage, and output stability.

The secondary batteries are classified into cylindrical batteries and prismatic batteries, in which an electrode assembly is embedded in a cylindrical or prismatic metal can, and pouch-type batteries, in which an electrode assembly is embedded in a pouch-type case made of an aluminum laminate sheet according to shapes of battery cases. In addition, recently, a thin film can-type battery using a metal thin film has been developed and used due to an increase in customer preference for a high output and long lifespan.

Such a thin film can-type battery is generally manufactured by accommodating an electrode assembly in a can, covering the electrode assembly, and performing laser welding (the thin film can means a thin metal). Also, in the laser welding, it is necessary to manufacture a product having excellent sealing properties by preventing a non-welded portion from occurring.

However, in the related art, in the laser welding, strong clamping is performed to prevent the non-welded portion from occurring through the strong adhesion, but in this case, a deformation of the metal thin film occurs to cause a problem. However, if it is not clamped strongly, there is a problem because the adhesion is not made properly, resulting in non-welded portion and poor sealing properties.

DISCLOSURE OF THE INVENTION

Technical Problem

The present invention has been devised to solve the above problems, and an object of the present invention is to provide a method for manufacturing a secondary battery, in which, when a thin film can is welded, a bonding portion is improved in adhesion to prevent an non-welded portion from occurring, thereby remarkably improving sealing properties, and a secondary battery manufactured by using the manufacturing method.

Technical Solution

A method for manufacturing a secondary battery according to the present invention comprises: a welding preparation process of preparing a lower can comprising an accommodation part in which an electrode assembly is accommodated, and an upper cover covering an upper opening of the lower can; a gripping process of gripping an end of a lower can circumferential portion and an end of an upper cover circumferential portion at upper and lower portions by using an upper jig and a lower jig in order to weld the lower can circumferential portion that is a portion extending outward from an edge of the accommodation part to the upper cover circumferential portion that is a circumferential area of the upper cover; and a welding process of irradiating laser onto a bonding portion that is a point, at which the lower can circumferential portion and the upper cover circumferential portion are bonded to each other, to bond the lower can circumferential portion to the upper cover circumferential portion through laser welding.

In the welding process, the laser welding may be performed in a state in which a height (b) of the accommodation part is formed to be higher than a height (a) of the end of the lower can circumferential portion.

In the welding process, a height of a central point of the upper cover may be higher than the height b of the accommodation part.

The lower jig may comprise a bottom part on which the lower can is placed and a sidewall formed on a circumference of the bottom part, the height (b) may mean a distance from the bottom part to an upper end of the accommodation part, and the height (a) of the end of the lower can circumferential portion may mean a distance from the bottom part to the end of the lower can circumferential portion.

In the welding process, an upper pressing surface that is a surface pressing upper cover the end of the circumferential portion in the upper jig and a lower pressing surface that is a surface pressing the end of the lower can circumferential portion in the lower jig may be parallel to the bottom part.

A value (b-a) obtained by subtracting the height (a) of the end of the lower can circumferential portion from the height (b) of the accommodation part may be greater than or equal to a thickness of a thinner base material of the lower can and the upper cover, which are welding base materials, and be less than three times the thickness of the thinner base material.

In a welding process, an upper pressing surface that is a surface pressing the end of the upper cover circumferential portion in the upper jig may further extend in a direction of the laser than a lower pressing surface that is a surface pressing the end of the lower can circumferential portion in the lower jig.

A width (c) of the upper pressing surface may be greater than a width (d) of the lower pressing surface.

An outer end point of the upper pressing surface and an outer end point of the lower pressing surface may be disposed in the same vertical line.

The upper jig may be provided in a right-angled triangle shape in cross section, and in the welding process, the upper jig may be disposed so that an oblique side of the right-angled triangle faces the laser.

A secondary battery according to the present invention comprises: an electrode assembly; a lower can comprising an accommodation part in which the electrode assembly is accommodated; and an upper cover configured to cover an upper opening of the lower can, wherein the lower can comprises a lower can circumferential portion that is a portion extending outward from an edge of the accommodation part, the upper cover comprises an upper cover circumferential portion bonded to the lower can circumferential portion as a circumferential area of the upper cover, and a bonding portion that is a point at which the lower can circumferential portion and the upper cover circumferential portion are bonded to each other has a height lower than a height (b) of the accommodation part.

A height of a central point of the upper cover may be higher than the height (b) of the accommodation part.

Advantageous Effects

The method for manufacturing the secondary battery according to the present invention may comprise: the welding preparation process of preparing the lower can comprising the accommodation part in which the electrode assembly is accommodated, and the upper cover covering the upper opening of the lower can; the gripping process of gripping the end of the lower can circumferential portion and the end of the upper cover circumferential portion at the upper and lower portions by using the upper jig and the lower jig in order to weld the lower can circumferential portion that is the portion extending outward from the edge of the accommodation part to the upper cover circumferential portion that is the circumferential area of the upper cover; and the welding process of irradiating laser onto the bonding portion that is the point, at which the lower can circumferential portion and the upper cover circumferential portion are bonded to each other, to bond the lower can circumferential portion to the upper cover circumferential portion through laser welding, and thus, when the thin film can is welded, the adhesion of the bonding portion, it is possible to prevent the non-welded portion from occurring, thereby realizing the significantly improved sealing properties in the thin film can-type battery.

The secondary battery according to the present invention may comprise: the electrode assembly; the lower can comprising the accommodation part in which the electrode assembly is accommodated; and the upper cover configured to cover the upper opening of the lower can, wherein the lower can may comprise the lower can circumferential portion that is the portion extending outward from the edge of the accommodation part, the upper cover may comprise the upper cover circumferential portion bonded to the lower can circumferential portion as the circumferential area of the upper cover, and a bonding portion that is the point at which the lower can circumferential portion and the upper cover circumferential portion may be bonded to each other has the height lower than the height (b) of the accommodation part. Therefore, it may be possible to realize the significantly improved sealing properties in the thin film can-type battery.

MODE FOR CARRYING OUT THE INVENTION

Hereinafter, preferred embodiments of the present invention will be described in detail with reference to the accompanying drawings so that those of ordinary skill in the art can easily carry out the present invention. However, the present invention may be implemented in several different forms and is not limited or restricted by the following examples.

In order to clearly explain the present invention, detailed descriptions of portions that are irrelevant to the description or related known technologies that may unnecessarily obscure the gist of the present invention have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Method for Manufacturing Secondary Battery According to Comparative Example

Figure 1:
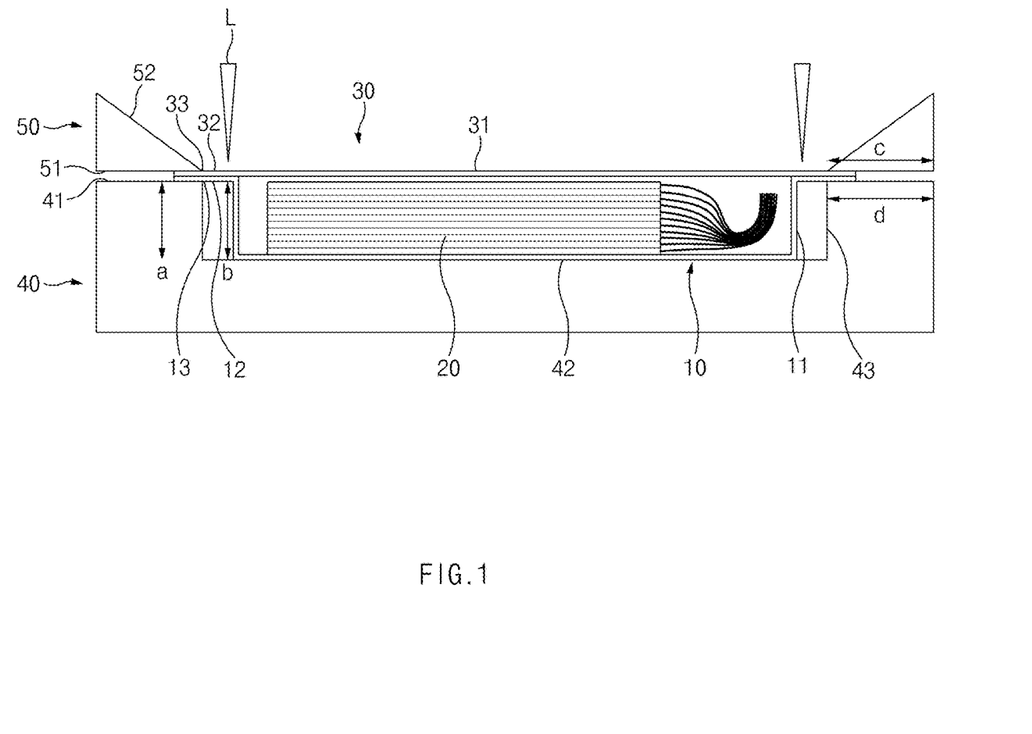
FIG. 1 is a cross-sectional view illustrating a method for manufacturing a secondary battery through laser welding according to a related art that is Comparative Example.

FIG. 1 is a cross-sectional view illustrating a method for manufacturing a secondary battery through laser welding according to a related art that is Comparative Example.

Referring to FIG. 1, in a method for manufacturing a secondary battery according to Comparative Example of the present invention, first, a lower can 10 comprising an accommodation part 11 in which an electrode assembly 20 is accommodated, and an upper cover 30 covering an upper opening of the lower can 10 may be prepared, and a lower can circumferential portion 12 and an upper cover circumferential portion 32 may be welded to manufacture a secondary battery. Here, each of the lower can 10 and the upper cover 30 may be a thin film can made of a thin metal.

The lower can circumferential portion 12 and the upper cover circumferential portion 32 may be disposed to overlap each other to weld the lower can circumferential portion 12 that is a portion extending outward from an edge of the accommodation part 11 to the upper cover circumferential portion 32 that is a circumferential area of the upper cover 30. In addition, an end 13 of the lower can circumferential portion and an end 33 of the upper cover circumferential portion may be gripped at upper and lower portions thereof by using an upper jig 50 and a lower jig 40. When there is no gap between the lower can circumferential portion 12 and the upper cover circumferential portion 32 during laser welding, a non-welded portion may not occur, and the welding may be performed well. For example, when welding a thin plate having a thickness of 75 µm (micrometer), the non-welded portion may occur even if a gap between base metals exceeds 10 µm (micrometer).

After being gripped at upper and lower portions by using an upper jig 50 and a lower jig 40, laser L is irradiated onto a bonding portion that is a point, at which the lower can circumferential portion 12 and the upper cover circumferential portion 32 are bonded to each other, to bond the lower can circumferential portion 12 to the upper cover circumferential portion 32 through laser welding.

However, in Comparative Example, in the laser welding process, the laser welding is performed in a state in which a height b of the accommodation part 11 and a height a of the end 13 of the lower can circumferential portion are equal to each other.

Specifically, the lower jig 40 comprises a bottom part 42 on which the lower can 10 is placed and a sidewall 43 formed on a circumference of the bottom part 42. A height b means a distance from the bottom part 42 to an upper end of the accommodation part 11, and a height a of the end 13 of the lower can circumferential portion means a distance from the bottom part 42 to the end 13 of the lower can circumferential portion.

Also, when a surface pressing an end 33 of the upper cover circumferential portion is referred to as an upper pressing surface 51 in the upper jig 50, and a surface pressing the end 13 of the lower can circumferential portion is referred to as a lower pressing surface 41, a width c of the upper pressing surface 51 and a width d of the lower pressing surface 41 are formed to be the same in Comparative Example. That is, the upper pressing surface 51 and the lower pressing surface 41 have widths corresponding to each other and face each other vertically, and an orthographic projection of the upper pressing surface 51 becomes the lower pressing surface 41. In this case, an inner end point of the upper pressing surface 51 and an inner end point of the lower pressing surface 41 may be disposed in the same vertical line.

According to the related art, the secondary battery is manufactured through the laser welding in the same manner as in Comparative Example. In this case, even though two base materials, that is, the lower can circumferential portion 12 and the upper cover circumferential portion 32 are in close contact with each other at both ends, possibility of occurrence of the gap is high at a portion at which actual welding is performed. Therefore, there is a problem because adhesion is not performed properly, resulting in non-welded portion and poor sealing properties.

Method for Manufacturing Secondary Battery According to Embodiment 1

Figure 2:
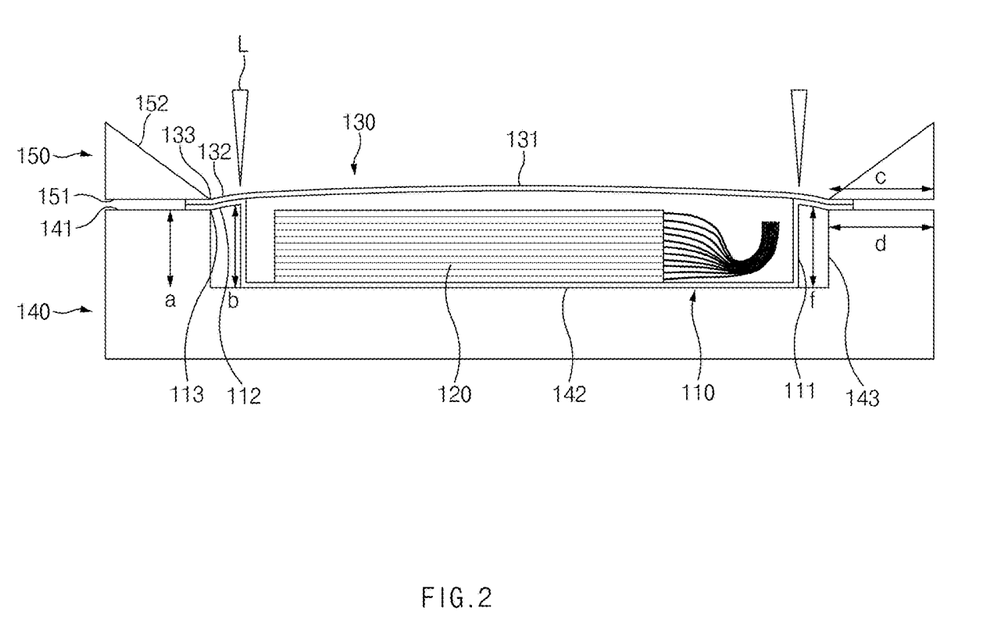
FIG. 2 is a cross-sectional view illustrating a method for manufacturing a secondary battery through laser welding according to Embodiment 1 of the present invention.

FIG. 2 is a cross-sectional view illustrating a method for manufacturing a secondary battery through laser welding according to Embodiment 1 of the present invention.

Referring to FIG. 2, a method for manufacturing a secondary battery according to Example 1 of the present invention comprises a welding preparation process, a gripping process, and a welding process.

The welding preparation process is a process of preparing a lower can 110 comprising an accommodation part 111 in which an electrode assembly 120 is accommodated, and an upper cover 130 covering an upper opening of the lower can 110. The accommodation part 111 of the lower can 110 may have a space recessed downward, and the upper cover 130 may have a flat plate shape. Each of the lower can 110 and the upper cover 130 may be a thin film can made of a thin metal.

In order to weld a lower can circumferential portion 112 that is a portion extending outward from an edge of the accommodation part 111 to an upper cover circumferential portion 132 that is a circumferential area of the upper cover 130, in the gripping process, the lower can circumferential portion 112 and the upper cover circumferential portion 132 are disposed to overlap each other, and an end 113 of the lower can circumferential portion and an end 133 of the upper cover circumferential portion are gripped at upper and lower portions thereof by using an upper jig 150 and a lower jig 140.

After being gripped at upper and lower portions by using an upper jig 150 and a lower jig 140, in the welding process, laser L is irradiated onto a bonding portion that is a point, at which the lower can circumferential portion 112 and the upper cover circumferential portion 132 are bonded to each other, to bond the lower can circumferential portion 112 to the upper cover circumferential portion 132 through laser welding.

In the method for manufacturing the secondary battery according to Embodiment 1 of the present invention, in the welding process, the laser welding is performed in a state in which a height b of the accommodation part 111 is formed to be higher than a height a of the end 113 of the lower can circumferential portion.

Specifically, the lower jig 140 comprises a bottom part 142 on which the lower can 110 is placed and a sidewall 143 formed on a circumference of the bottom part 142. The height b means a distance from the bottom part 142 to an upper end of the accommodation part 111, and the height a of the end 113 of the lower can circumferential portion means a distance from the bottom part 142 to the end 113 of the lower can circumferential portion.

The method for manufacturing the secondary battery according to Embodiment 1 of the present invention may realize significantly improved sealing properties by preventing an occurrence of a non-welded portion by improving adhesion of the bonding portion through the welding in this manner.

One method of interpreting this may be interpreted that, as the bottom part 142 of the lower jig 140 pushes up the accommodation part 111 of the lower can 110, an edge of the accommodation part 111 applies the force of pushing up the lower can circumferential portion 112 so that the close contact is reliably realized at the bonding portion.

Another method of interpreting this may be interpreted that the upper jig 150 applies relatively downward pushing force to the end 133 of the upper cover circumferential portion so that the close contact is reliably realized at the bonding portion.

In addition, in the method for manufacturing the secondary battery according to Embodiment 1 of the present invention, in the welding process, the upper pressing surface 151 that is a surface pressing the end 133 of the upper cover circumferential portion in the upper jig 150 and the lower pressing surface 141 that is a surface pressing the end 113 of the lower can circumferential portion in the lower jig 140 may be parallel to the bottom part 142 of the lower jig 140. When formed in this manner, force at which an edge of the accommodation part 111 pushes up the lower can circumferential portion 112 may act more strongly. Alternatively, force at which the upper jig 150 pushes relatively down the end 133 of the upper cover circumferential portion may act more strongly.

In addition, a height of a central point 131 of the upper cover may be higher than the height b of the accommodation part 111. This may be a shape that appears because the upper cover 130 is provided as a thin film can.

In the method of manufacturing the secondary battery according to Embodiment 1 of the present invention, a value b-a obtained by subtracting the height a of the end 113 of the lower can circumferential portion from the height b of the accommodation part 111 may be greater than or equal to a thickness of a thinner base material of the lower can 110 and the upper cover 130, which are welding base materials, and be less than three times the thickness of the thinner base material.

If the value b-a is less than the thickness of the thinner base material, an effect of the present invention described above may be weakened. In addition, when the value b-a is greater than three times the thickness of the thinner base material, deformation of the thin film can becomes severe, and an inclination of each of the lower can circumferential portion 112 and the upper cover circumferential portion 132 increases to cause a problem, in which welding performance and efficiency are relatively deteriorated.

In the method for manufacturing the secondary battery according to Embodiment 1 of the present invention, a width c of the upper pressing surface 151 and a width d of the lower pressing surface 141 are formed to be the same. That is, the upper pressing surface 151 and the lower pressing surface 141 have widths corresponding to each other and face each other vertically, orthographic projection of the upper pressing surface 151 becomes the lower pressing surface 141.

In this case, the height b of the accommodation part 111 may be higher than a height f of the lower can circumferential portion 112, and the height f of the lower can circumferential portion 112 may be higher than the height a of the end 113 of the lower can circumferential portion. This may be because a sequential inclination is formed from an upper end of the accommodation part 111 to the end 113 of the lower circumferential portion through the lower can circumferential portion.

In the method for manufacturing the secondary battery according to Embodiment 1 of the present invention, since the width c of the upper pressing surface 151 and the width d of the lower pressing surface 141 are the same as each other, an effect of the force at which the upper jig 150 pushes relatively downward the end 133 of the upper cover circumferential portion may be less than that in Embodiment 2 that will be described below.

Method for Manufacturing Secondary Battery According to Embodiment 2

Figure 3:
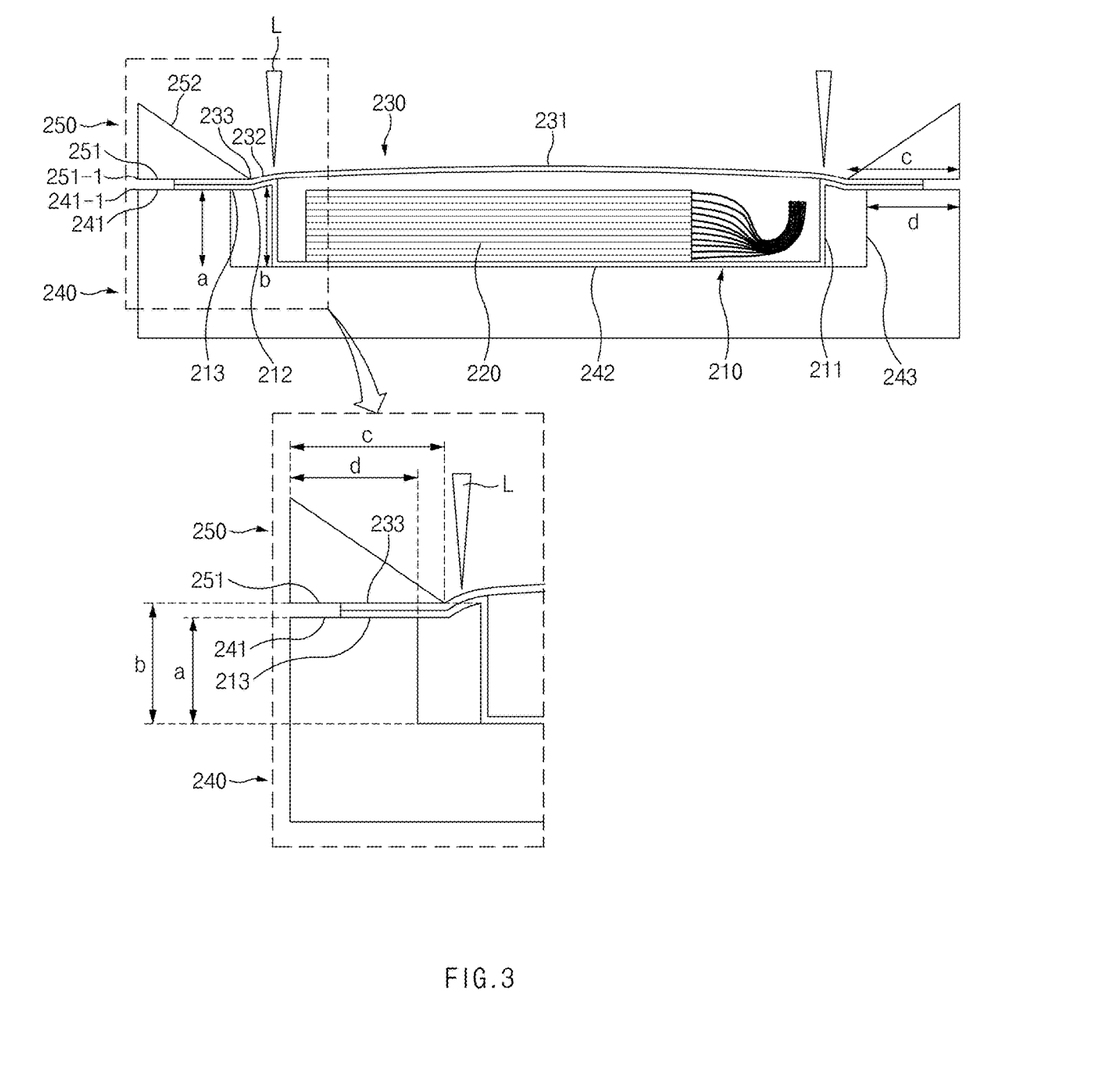
FIG. 3 is a cross-sectional view illustrating a method for manufacturing a secondary battery through laser welding according to Embodiment 2 of the present invention.

FIG. 3 is a cross-sectional view illustrating a method for manufacturing a secondary battery through laser welding according to Embodiment 2 of the present invention.

Embodiment 2 according to the present invention may be different from Embodiment 1 in that an upper pressing surface and a lower pressing surface have shapes different from those in Embodiment 1.

The contents that are duplicated with Embodiment 1 will be omitted as much as possible, and Embodiment 2 will be described with a focus on the differences. That is, it is obvious that the contents that are not described in Embodiment 2 may be regarded as the contents of Embodiment 1 if necessary.

Referring to FIG. 3, in the method for manufacturing the secondary battery according to Embodiment 2 of the present invention, in a welding process, an upper pressing surface 251 that is a surface pressing an end 233 of an upper cover circumferential portion in an upper jig 250 may further extend in a direction to laser L than a lower pressing surface 241 that is a surface pressing an end 213 of a lower can circumferential portion in a lower jig 240.

In this case, force at which the upper jig 250 pushes relatively down the end 232 of the upper cover circumferential portion 232 may act more strongly. Thus, close contact may be made more reliably at a bonding portion at which welding is performed.

In Embodiment 2 of the present invention, a height b of the accommodation part 211 may be higher than a height a of the end 213 of the lower can circumferential portion. This is the same as in Embodiment 1.

Also, in Embodiment 2 of the present invention, a width c of the upper pressing surface 251 may be greater than a width d of the lower pressing surface 241. In addition, an outer end point 251-1 of the upper pressing surface and an outer end point 241-1 of the lower pressing surface may be disposed in the same vertical line. When each of the upper jig 250 and the lower jig 240 has the above-described shape, the lower can circumferential portion 212 and cover the upper circumferential portion 232 may be gripped and supported remarkably stably at upper and lower portions thereof without shaking.

In the method for manufacturing the secondary battery according to Embodiment 2 of the present invention, the upper jig 250 is provided in a right-angled triangle shape in cross section, and in the welding process, the upper jig 250 may be disposed so that an oblique side 252 of the right-angled triangle faces the laser L. When formed as described above, when the laser irradiates the bonding portion onto the circumferential portion of the cover, possibility that a laser nozzle moves to collide with the upper cover 230 may be reduced. Thus, more stable welding may be possible.

Secondary Battery

A secondary battery according to the present invention comprises a lower can, an upper cover, and an electrode assembly and may have the following characteristics.

The electrode assembly may be formed by alternately stacking electrodes and separators. The lower can may comprise an accommodation part in which the electrode assembly is accommodated. The upper cover may have a shape to cover an upper opening of the lower can.

The lower can comprises a lower can circumferential portion that is a portion extending outward from an edge of the accommodation part, and the upper cover comprises an upper cover circumferential portion bonded to the lower can circumferential portion as a circumferential area of the upper cover. A bonding portion that is a point at which the lower can circumferential portion and the upper cover circumferential portion are bonded to each other may have a height less than a height b of the accommodation part. In addition, a height of a central point of the upper cover may be higher than the height b of the accommodation part.

The secondary battery according to the present invention may have significantly improved sealing properties at the bonding portion.

<Experimental Result>

Comparative Example 1-①

A lower can and an upper cover were welded to each other. Welding was performed using 500 W class laser of IPG company. The welding was performed under conditions, in which a laser beam size is 30 μm to 200 μm (micrometer), power is 50 W to 500 W, a material of the lower can is SUS316L, a thickness of the lower can is 75 μm, a material of the upper cover is SUS316L, and a thickness of the upper cover is 75 μm.

In Comparative Example 1, the welding was performed under a condition, in which a value b-a obtained by subtracting a height a of an end of the lower can circumferential portion from a height b of an accommodation part is 0 μm.

Manufacturing Example 1-②

A lower can and an upper cover were welded to each other according to the present invention. Welding was performed using 500 W class laser of IPG company. The welding was performed under conditions, in which a laser beam size is 30 μm to 200 μm (micrometer), power is 50 W to 500 W, a material of the lower can is SUS316L, a thickness of the lower can is 75 μm, a material of the upper cover is SUS316L, and a thickness of the upper cover is 75 μm.

In Manufacturing Example 1, the welding was performed under a condition, in which a value b-a obtained by subtracting a height a of an end of the lower can circumferential portion from a height b of an accommodation part is 75 μm.

Manufacturing Example 2-③

Welding was performed under the same condition as in Manufacturing Example 1 except that the welding was performed under the condition, in which a value b-a obtained by subtracting a height a of an end of a lower can circumferential portion from a height b of an accommodation part is 150 μm.

Experimental Example—Weldability Comparison

Figure 4:
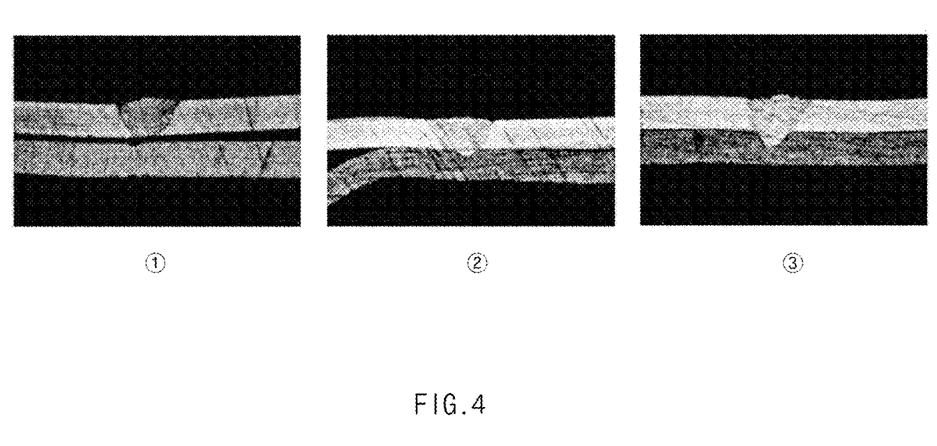
FIG. 4 is a view illustrating experimental results of testing weldability for each of Comparative Example and Manufacturing Example.

FIG. 4 is a view illustrating experimental results of testing weldability for each of Comparative Example and Manufacturing Examples 1 and 2.

In the case of Comparative Example 1, in which the welding is performed under the condition, in which the value b-a is 0 μm (i.e., values of a and b are the same), a cross-sectional view of the welded portion is illustrated at a left ① in FIG. 4. In Comparative Example 1, it is seen that an non-welded portion occurs due to an occurrence of a gap between the lower can and the upper cover.

In the case of Manufacturing Example 1, in which the welding is performed under the condition, in which the value b-a is 75 μm (i.e., the value b is greater 75 μm than the value a), a cross-sectional view of the welded portion is illustrated in the middle ② in FIG. 4. In the case of Manufacturing Example 1, it is seen that good welding is achieved because a gap does not occur between the lower can and the upper cover.

In the case of Manufacturing Example 2, in which the welding is performed under the condition, in which the value b-a is 150 μm (i.e., the value b is greater 150 μm than the value a), a cross-sectional view of the welded portion is illustrated at a right ③ in FIG. 4. In the case of Manufacturing Example 2, it is seen that the welding is performed in a state in which strong adhesion is provided between the lower can and the upper cover, and stronger bonding is provided rather than that of Manufacturing Example 1.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS 10, 110, 210: Lower can
11, 111, 211: Accommodation part
12, 112, 212: Lower can circumferential portion
13, 113, 213: End of lower can circumferential portion
20, 120, 220: Electrode assembly
30, 130, 230: Upper cover
31, 131, 231: Central point of upper cover
32, 132, 232: Circumferential portion of upper cover
33, 133, 233: End of upper cover circumferential portion
40, 140, 240: Lower jig
41, 141, 241: Lower pressing surface
42, 142, 242: Bottom part
43, 143, 243: Sidewall
50, 150, 250: Upper jig
51, 151, 251: Upper pressing surface
52, 152, 252: Oblique side of right-angled triangle
L: Laser

The invention claimed is:

1. A method for manufacturing a secondary battery, the method comprising:
preparing a lower can comprising an accommodation part in which an electrode assembly is accommodated, and an upper cover covering an upper opening of the lower can;
gripping an end of a lower can circumferential portion and an end of an upper cover circumferential portion at upper and lower portions using an upper jig and a lower jig to weld the lower can circumferential portion that is a portion extending outward from an edge of the accommodation part to the upper cover circumferential portion that is a circumferential area of the upper cover; and
irradiating a laser onto a bonding portion, at which the lower can circumferential portion and the upper cover circumferential portion are welded to each other to bond the lower can circumferential portion to the upper cover circumferential portion,
wherein, in the irradiating, laser welding is performed in a state in which a height of the accommodation part is higher than a height of the end of the lower can circumferential portion.

2. The method of claim 1, wherein, in the irradiating, laser welding is performed in a state in which the height of the accommodation part is higher than a height of the lower can circumferential portion, and the height of the lower can circumferential portion is higher than the height of the end of the lower can circumferential portion.

3. The method of claim 2, wherein, in the irradiating, a height of a central point of the upper cover is higher than the height of the accommodation part.

4. The method of claim 1, wherein the lower jig comprises a bottom part on which the lower can is placed and a sidewall formed on a circumference of the bottom part,
wherein the height is a distance from the bottom part to an upper end of the accommodation part, and wherein the height of the end of the lower can circumferential portion is a distance from the bottom part to the end of the lower can circumferential portion.

5. The method of claim 4, wherein, in the laser welding process, an upper pressing surface that is a surface pressing the end of the upper cover circumferential portion in the upper jig and a lower pressing surface that is a surface pressing the end of the lower can circumferential portion in the lower jig are parallel to the bottom part.

6. The method of claim 1, wherein a value obtained by subtracting the height of the end of the lower can circumferential portion from the height of the accommodation part is greater than or equal to a thickness of a thinner base material of the lower can and the upper cover, which are welding base materials, and is less than three times the thickness of the thinner base material.

7. The method of claim 1, wherein, in the irradiating, an upper pressing surface that is a surface pressing the end of the upper cover circumferential portion in the upper jig further extends in a direction to the laser than a lower pressing surface that is a surface pressing the end of the lower can circumferential portion in the lower jig.

8. The method of claim 7, wherein a width of the upper pressing surface is greater than a width of the lower pressing surface.

9. The method of claim 8, wherein an outer end point of the upper pressing surface and an outer end point of the lower pressing surface are disposed in the same vertical line.

10. The method of claim 1, wherein the upper jig is provided in a right-angled triangle shape in cross section, and wherein, in the irradiating, the upper jig is disposed so that an oblique side of the right-angled triangle faces the laser.

11. A secondary battery comprising:

an electrode assembly;

a lower can comprising an accommodation part in which the electrode assembly is accommodated; and an upper cover configured to cover an upper opening of the lower can, wherein the lower can comprises a lower can circumferential portion that extends outward from an edge of the accommodation part, wherein the upper cover comprises an upper cover circumferential portion bonded to the lower can circumferential portion as a circumferential area of the upper cover, wherein a bonding portion that is a point at which the lower can circumferential portion and the upper cover circumferential portion are bonded to each other has a height lower than a height of the accommodation part, and wherein a height of a central point of the upper cover is higher than the height of the accommodation part.

* * * * *